United States Patent
Bouiller et al.

(10) Patent No.: US 6,179,225 B1
(45) Date of Patent: Jan. 30, 2001

(54) TURBO JET ENGINE EXHAUST NOZZLE WITH MASKED GAS JET

(75) Inventors: Philippe Pierre Bouiller, Samoreau; Pierre-Yves Bourquin, Paris; Daniel Kettler, Chartrettes; Jean-Pierre Ruis, Le Chatelet En Brie, all of (FR)

(73) Assignee: Societe Nationale d'Etude et de Construction de Moteurs d'Aviation "SNECMA" (FR)

( * ) Notice: Under 35 U.S.C. 154(b), the term of this patent shall be extended for 0 days.

(21) Appl. No.: 09/356,362

(22) Filed: Jul. 19, 1999

(30) Foreign Application Priority Data

Jul. 17, 1998 (FR) .................................................. 98 09129

(51) Int. Cl.[7] .................................................... B63H 25/46

(52) U.S. Cl. ........................................ 239/265.17; 60/264

(58) Field of Search ......................... 239/265.17, 265.19, 239/139, 127.3; 60/264, 262, 39.5, 265

(56) References Cited

U.S. PATENT DOCUMENTS

| | | | |
|---|---|---|---|
| 2,603,060 | * 7/1952 | Brown | 60/264 |
| 2,651,172 | * 9/1953 | Kennedy | 60/204 |
| 2,958,188 | * 11/1960 | Leitner et al. | 60/262 |
| 3,210,934 | * 10/1965 | Smale | 60/264 |
| 3,921,906 | * 11/1975 | Nye et al. | 239/127.3 |
| 3,970,252 | * 7/1976 | Smale et al. | 239/127.3 |
| 3,981,143 | * 9/1976 | Ross et al. | 60/264 |
| 4,000,854 | * 1/1977 | Konarski et al. | 239/265.35 |
| 4,002,024 | * 1/1977 | Nye et al. | 60/262 |
| 4,004,416 | * 1/1977 | Amelio et al. | 60/264 |
| 4,026,472 | * 5/1977 | Rabone | 239/127.3 |
| 4,136,518 | * 1/1979 | Hurley et al. | 60/264 |
| 4,215,537 | * 8/1980 | Hurley | 60/204 |
| 4,226,084 | * 10/1980 | Spears, Jr. | 60/262 |
| 4,295,332 | * 10/1981 | Steyer et al. | 60/264 |
| 4,312,480 | 1/1982 | Miller | 239/127 |
| 4,463,902 | * 8/1984 | Nightingale | 239/265.17 |
| 4,502,636 | * 3/1985 | Nightingale et al. | 239/265.17 |
| 4,537,026 | * 8/1985 | Nightingale | 60/264 |
| 4,544,098 | * 10/1985 | Warburton | 239/127.3 |
| 4,621,769 | * 11/1986 | Szuminski | 239/265.39 |
| 4,641,782 | 2/1987 | Woodward | 239/265 |
| 4,876,851 | * 10/1989 | Mueller | 60/264 |
| 4,993,641 | 2/1991 | Kehret et al. | 239/127 |
| 4,994,660 | * 2/1991 | Hauer | 239/265.41 |
| 5,076,496 | * 12/1991 | Lippmeier | 239/265.41 |

(List continued on next page.)

FOREIGN PATENT DOCUMENTS

| | | |
|---|---|---|
| 0 646 720 | 4/1995 | (EP) . |
| 1 479 351 | 2/1991 | (FR) . |

Primary Examiner—Charles G. Freay
Assistant Examiner—Robert Z. Evora
(74) Attorney, Agent, or Firm—Bacon & Thomas PLLC

(57) ABSTRACT

An axially symmetric turbojet engine exhaust-nozzle includes a system for masking the exhaust jet, such system including inner hot flaps (7), hinging on a conical shell (4) and driven by a first control ring (10) powered by linear actuators (11), and outer cold flaps (20) hinging on an annular assembly (12) and driven by a second control ring (22) powered by linear actuators (23) to vary the angle of the cold flaps. The annular assembly (12) is axially displaceable by a third set of linear actuators (30). Each cold flap (20) comprises an inner skin (40) fitted with orifices (43) and hinging on the annular assembly (12) and an outer skin (41) spaced radially away of the inner skin (40) to define an air flow channel between the skins. When the annular assembly (12) is moved downstream by the third set of linear actuators (30), the outer skins (41) form a scoop introducing fresh air into the cold flaps (20), and said air is injected into the hot gas flow through the orifices (43) in the inner skin and other orifices (44) at the trailing edge (42) of the cold flaps to reduce the exhaust signature.

7 Claims, 4 Drawing Sheets

U.S. PATENT DOCUMENTS

| | | | |
|---|---|---|---|
| 5,082,182 | * | 1/1992 | Bruchez, Jr. et al. .......... 239/265.35 |
| 5,359,851 | * | 11/1994 | Bannerot et al. ...................... 60/271 |
| 5,404,713 | * | 4/1995 | Johnson ................................ 60/204 |
| 5,485,959 | * | 1/1996 | Wood et al. ..................... 239/265.41 |
| 5,720,434 | * | 2/1998 | Vdoviak et al. .................. 239/127.1 |
| 5,746,047 | * | 5/1998 | Steyer et al. .......................... 60/39.5 |

* cited by examiner

TURBO JET ENGINE EXHAUST NOZZLE WITH MASKED GAS JET

BACKGROUND OF THE INVENTION

1. Field of the Invention

The invention relates to an exhaust nozzle of variable cross-section mounted at the downstream end of a stationary, cross-sectionally circular outlet of a turbojet-engine hot-gas exhaust duct.

2. Discussion of Related Art

Some military aircraft equipped with turbojet engines must carry out missions in subsonic as well as supersonic flight. Such turbojet engines are typically fitted with an after-burner system and with either an axially symmetrical nozzle or substantially two-dimensional exhaust nozzle.

The nozzle must have a variable cross-section if used on afterburner-fitted gas-turbine engines.

In order to gain more thrust at normal full power and at full power with afterburning, a composite nozzle has been developed overtime with converging and diverging variable cross-sections. The kinematics and technology of these converging/diverging nozzles are complex and they are heavy.

In most cases the exhaust nozzle is restricted at its converging portion to allow comparatively simple engineering while achieving satisfactory results.

It is this kind of axially symmetric nozzle which is the object of the present invention.

BRIEF SUMMARY OF THE INVENTION

More specifically the invention relates to converging, axially symmetric nozzle for an aircraft turbojet engine, where this nozzle comprises a conical shell affixed to the end portion of the turbojet engine, an inner ring of so-called hot flaps mounted on the distal end of the conical shell, an external ring of so-called cold flaps mounted on the distal end of an annular assembly located between the conical shell and an external cowl, said outer ring of cold flaps extending downstream in the direction of the flow of the exhaust gases beyond the external cowl and the inner hot-flap ring. Further, the invention relates to first a control means supported on the conical shell to drive the hot flaps pivotally connected at their upstream ends to the conical shell, and second control means supported on the annular assembly to drive the cold flaps that are pivotally attached at their upstream ends to the annular assembly.

The objective of the invention is to reduce the infrared signature of this kind of nozzle by providing simple means to introduce fresh ambient or external air into the flow of exhaust gases for certain nozzle configurations in order to lower the flow and its temperature.

Each cold flap comprises an inner skin hingedly mounted on the annular assembly and which includes a plurality of inner orifices, and further each cold flap includes an outer skin radially spaced from the inner skin, wherein the two skins converge toward the trailing edge of the flap, and wherein the annular structure is axially displaceable when driven by a third control means between a first position whereat the outer skins are situated in alignment with the external cowl and a second position whereat the outer skins are located downstream of the external cowl and constitute a scoop for injecting external air into the flow of exhaust gases through the orifices of the inner skins in order to reduce the infrared signature of the exhausted gases.

Complementary orifices may be provided in the trailing edge of each cold flap.

The invention further includes the following improvements:

the first control means comprises a first axially displaceable control ring connected by linkrods to the hot flaps and driven by a plurality of first linear actuators anchored on the conical shell;

the second control means comprise a second axially displacement ring driven by a plurality of two linear actuators anchored on the annular structure;

the second control ring comprises a plurality of studs fitted with cam rollers rolling in follower apertures of the inner skins of the cold flaps;

the conical shell is connected at its upstream end to a cylindrical shell extending downstream and including a guide to axially guide the annular assembly, the third control means comprising a plurality of third linear actuators anchored on the upstream end of the cylindrical shell.

DESCRIPTION OF THE DRAWINGS

Other advantages and features of the invention are shown in the illustrative description below with reference to the attached drawings, where.

DETAILED DESCRIPTION OF A PREFERRED EMBODIMENT OF THE INVENTION

Figure 1:
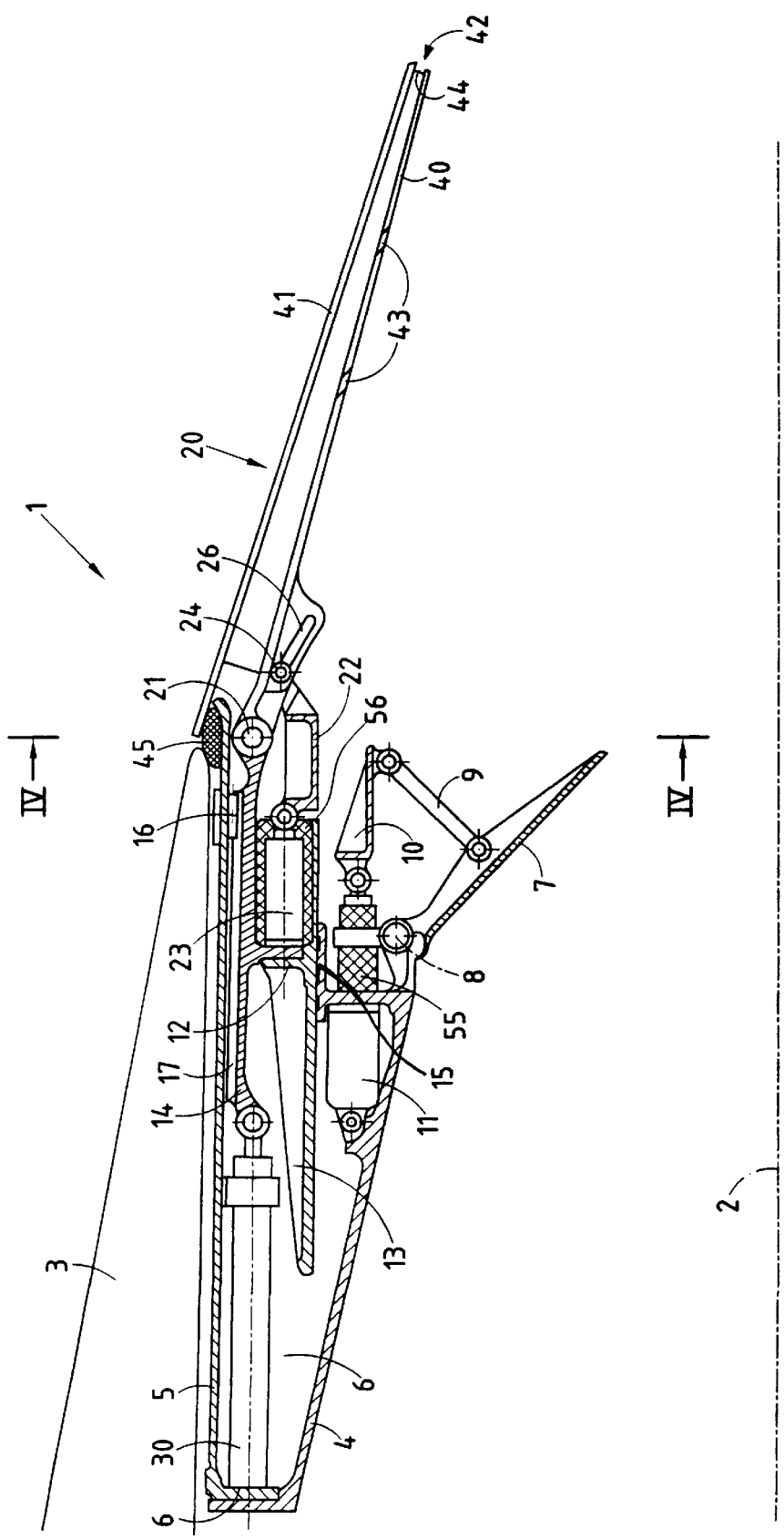
FIG. 1 is an elevation section view of one half a nozzle taken in a plane passing through the axis of symmetry of the axially symmetric nozzle according to the invention configured for full-power operation without after-burning and with unattenuated infrared signature.

The drawing shows an exhaust nozzle 1 having a longitudinal axis 2 and situated downstream of an afterburner chamber (omitted from the drawings) of an aircraft turbojet engine the end which comprises an aerodynamic external cowling 3 enclosing the front portion of the nozzle 1.

The exhaust nozzle 1 comprises a conical shell affixed upstream to the downstream end of the casing of the afterburning chamber and a cylindrical shell 5 situated near the external cowling 3 and connected at its upstream end 6 to the conical shell 4. Between them, the conical shell 4 and the cylindrical shell 5 define an annular cavity 6 open in the downstream direction.

A first ring of flaps 7, termed "hot flaps", is situated at the terminal or distal end of the conical shell 4. Each hot flap 7 is pivotally connected at its upstream end to the distal end of the conical shell 4 on a pivot rod 8 and is connected by a linkrod 9 to a first control ring 10 located concentric with the axis 2.

The first control ring 10 is moveable in a direction parallel to the axis 2 by a plurality of first linear actuators 11 fixed in the cavity 6 on the conical shell 4. The linear actuators 11 are synchronized to function together and are mounted in a fixed manner to the conical shell 4.

An annular assembly 12 concentric with axis 2 is mounted between the conical shell 4 and the cylindrical shell 5 and is moveable in a direction parallel with the axis 2.

The annular assembly 12 comprises two cylindrical, concentric and mutually ganged shells 13, 14 concentric with axis 2. The inner cylindrical shell 13 is slidable on guides 15 on the outer side surface of the conical shell 4 and the outer cylindrical shell 14 is axially guided relative to the cylindrical shell 5 of the nozzle I by rollers 16 carried by shell 5 and which cooperate with axial grooves 17 in the outside surface of the outer cylindrical shell 14.

Figure 3:
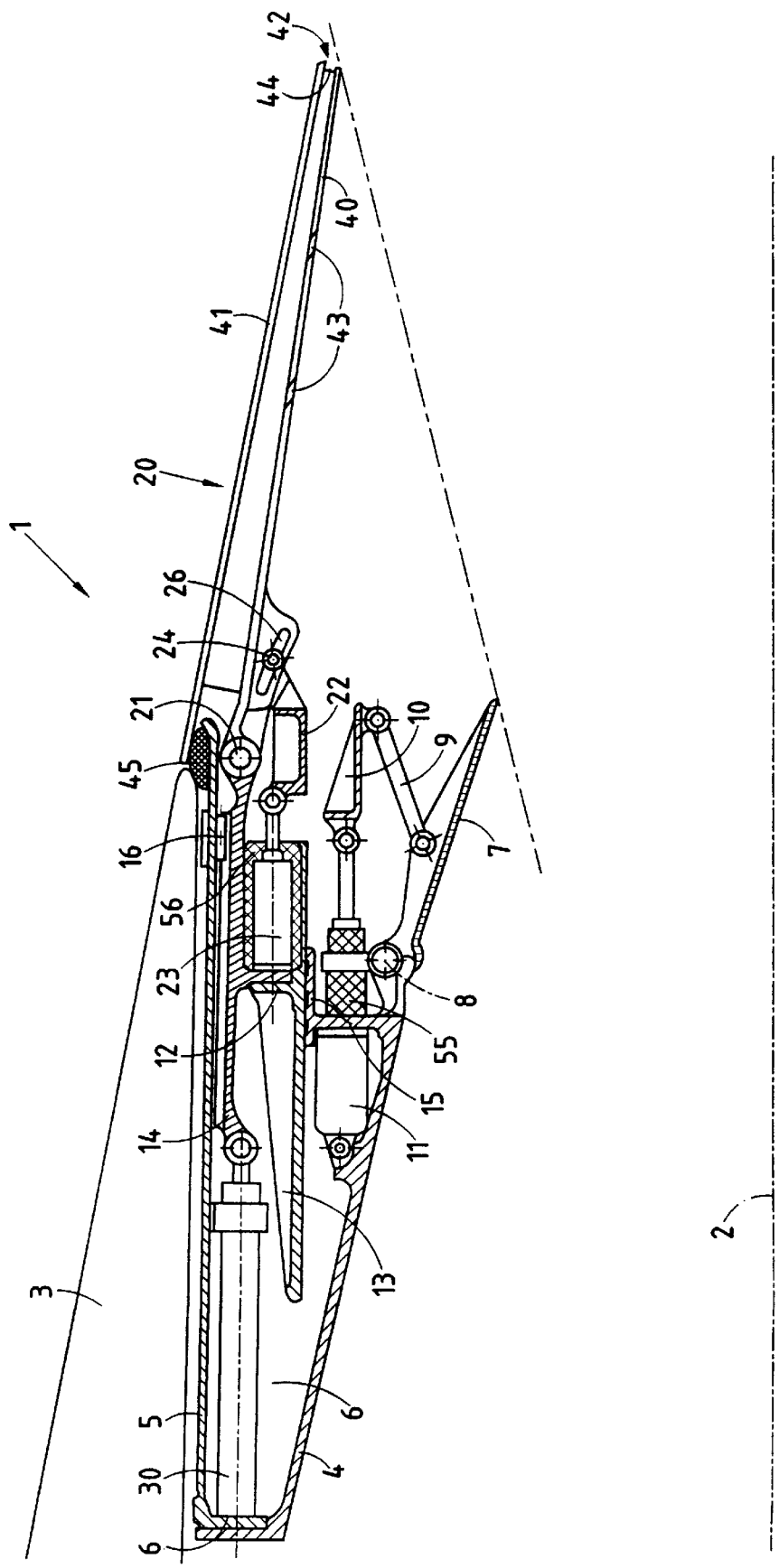
FIG. 3 shows the nozzle of FIG. 1 in a full-power configuration with afterburning and with unattenuated infrared signature.
Figure 4:
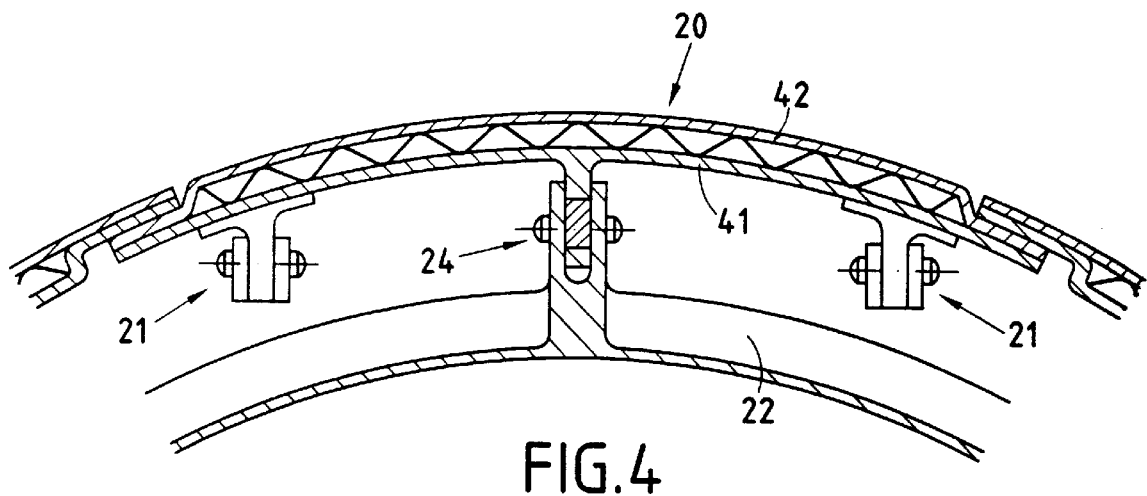
FIG. 4 is a section along line IV—IV of FIG. 1 showing the linkage between the cold flaps and the control ring for these flaps.
Figure 5:
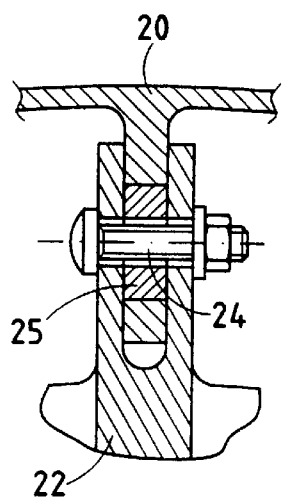
FIG. 5 is a detailed view of the linkage between the control ring and a cold flap.

A second ring of "cold flaps" 20 is mounted downstream of the outer cylindrical shell 14, with each cold flap 20 pivotally connected at its upstream end by means of a pivot rod 21 on the downstream or distal end of the outer cylindrical shell 14. The cold flaps 20 are controlled by a second annular control ring 22 concentric with axis 2 and displaceable parallel with axis 2 by means of a plurality of second synchronized linear actuators 23 fixed to the annular assembly 12. The second control ring 22 is connected to the cold flaps 20 by pivot pins 24 rigidly joined to the second control ring 22. These pins 24 are fitted with cam rollers 25 rolling inside slotted follower apertures 26 in the inside surfaces of the cold flaps 20 (See FIG. 5). Actuation of second actuators 23 enables varying the total nozzle end area within the cold flaps 20 by varying the angle of the cold flaps relative to axis 2 (see FIGS. 1 and 3).

A third set of synchronized linear actuators 30 is situated between the upstream end of the conical shell 4 and the outer cylindrical shell 14 of the annular assembly 12.

Each cold flap 20 includes an inner skin 40, the upstream end of which is pivotally connected to the annular assembly 12, and an outer skin 41 connected to and radially spaced away from the inner skin 40 to define an air flow channel between them. These two skins 40 and 41 converge as they approach the trailing edge 42. The inner skin 40 includes a plurality of orifices 43 in communication with the air flow channel and the nozzle outlet exit area. Moreover, a plurality of orifices 44 is provided in the trailing edges 42 of cold flaps 20 to provide other outlets for air in the air flow channel.

When the linear actuators 30 are retracted, the outer skin 41 of each cold flap 20 is located in alignment with the external cowl 3. A seal 45 mounted between the downstream end of the cylindrical shell 5 and the downstream end of the external cowl 3 assures smooth continuity of the external flow between the external cowl 3 and the outer skin 41.

Figure 2:
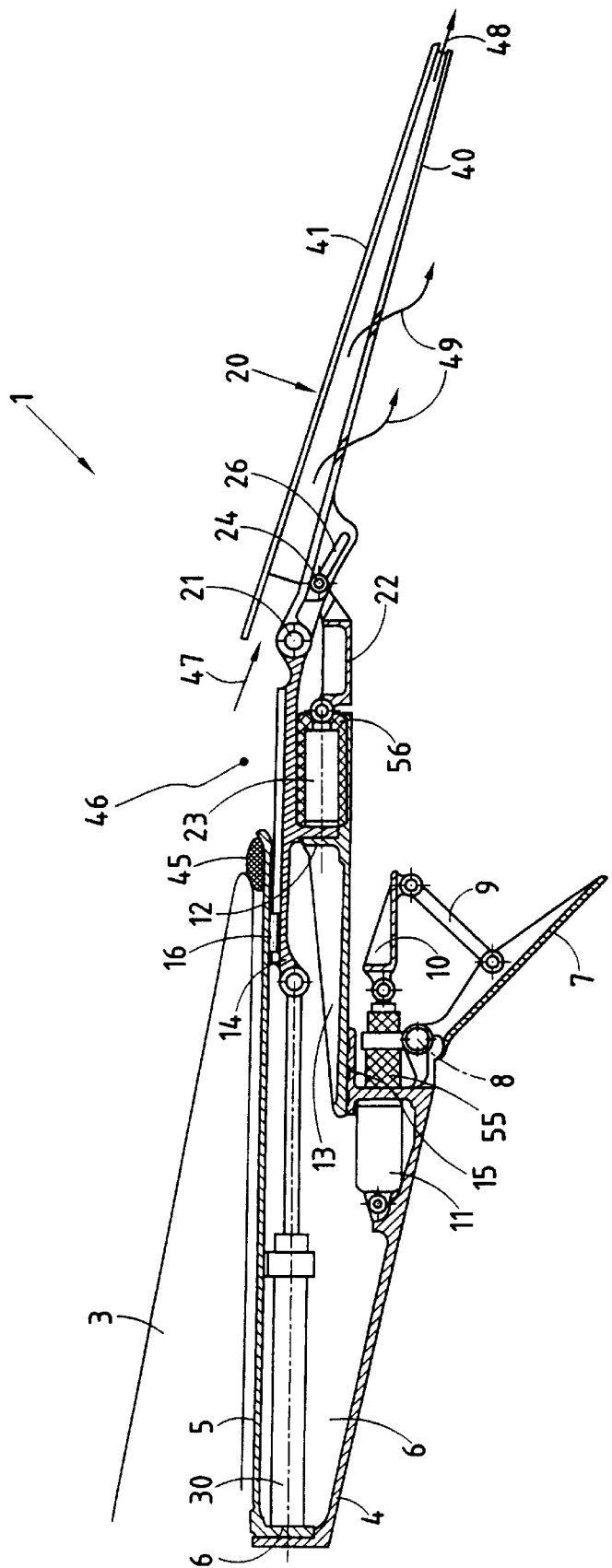
FIG. 2 shows the nozzle of FIG. 1 in a full-power configuration without afterburning and with attenuated infrared signature.

When, on the other hand, the linear actuators 30 are extended, as shown in FIG. 2, the annular assembly 12 and the cold flaps 20 are shifted downstream parallel to axis 2. In this case, sealing in the vicinity of the seal 45 is interrupted relative to the outer skins 41 of the cold flaps 20, and a passage 46 is exposed between the seal 45 and the outer skins 41.

When so extended, an air scoop 47 is formed at the upstream end of the outer skins 41 of flaps 20. Outside air flow 47 moves through the air flow channel between the outer skins 41 and inner skins 40 of the cold flaps 20. A portion 48 of this flow is discharged at the trailing edge 42 of the cold flaps 20 through the orifices 44 and the other portion 49 is injected through the orifices 43 of the inner skins 40 into the flow of hot exhaust gases in the nozzle 1.

This flow of fresh cool air 47 makes it possible on one hand to cool the cold flaps 20 and on the other hand to lower the gas-exhaust temperature, thereby reducing the infrared engine signature. The magnitude of the injected flow of fresh air may vary as a function of the angular position of the cold flaps 20.

Figure 6:
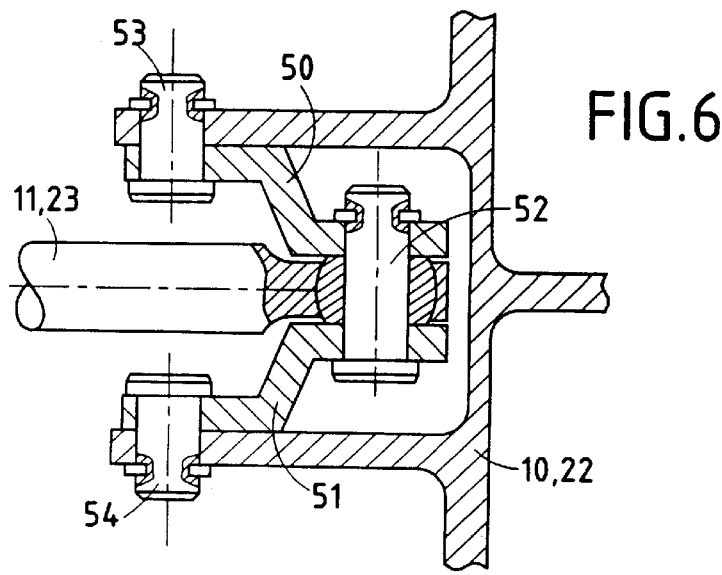
FIG. 6 shows a detail of the linkage between an actuator rod and the control ring driven by this actuator.

FIG. 6 shows the connection of the rods of the linear actuators 11 and 23 to the control rings 10 and 22. Linkrods 50 and 51 are inserted between a pin 52 fixed to the actuator head and coaxial pins 53, 54 borne by the corresponding ring. Moreover the rods of the linear actuators 11 and the linear actuators 23 are protected against the ambient temperature by thermal insulation 55 and 56 (FIG. 1).

The first linear actuators 11 will axially displace the first control ring 10 whereby the inclination of the hot flaps 7 relative to the axis 2 is changed.

The third linear actuators 30 allow jointly shifting axially the annular assembly 12 and the cold flaps 20 without changing the inclination of these cold flaps relative to axis 2.

It will be understood that when the linear actuators 30 are retracted, the cold flaps 20 are aligned with the external cowl 3 and are substantially situated downstream of the hot flaps 7.

Other embodiments of the invention can be envisioned in accordance with the general knowledge of a person skilled in the art, and the invention is not limited to the specific construction illustrated.

What is claimed is:

1. In an axially symmetric, variable area and converging exhaust nozzle for an aircraft turbojet engine, the nozzle including a ring of inner hot flaps pivotally mounted at their upstream ends to the downstream end of conical shell fixedly located at an inner outlet area of the nozzle and actuatable by a first set of actuators between radially inward and outward positions, and a ring of outer cold flaps located radially outwardly of and downstream of the hot flaps, said cold flaps pivotally connected at their upstream ends to annular assembly located between the conical shell and an outer cowl extending around the outlet area of the nozzle, said cold flaps movable between radially inner and outer pivoted positions by a second set of actuators carried by the annular assembly to vary a terminal nozzle outlet area located within the cold flaps, the improvement comprising:

said cold flaps each comprising an inner and outer skin radially separated from each other to define a longitudinal airflow channel between them and converging toward each other as they approach their trailing ends, the inner skin including orifices providing communication between the airflow channel and the nozzle flow area, and said inner skin carrying a pivot hinge connecting the cold flap to the annular assembly;

said outer skin being aligned with a downstream end of the outer cowl when the cold flaps are in a forward retracted location and longitudinally separated from a downstream end of the outer cowl when the cold flaps are in a rearward extended position:

said outer skin in the extended position defining an ambient fresh air scoop leading to said air flow channel;

a third actuator arrangement for moving said actuator assembly and cold flaps between longitudinally separated retracted and extended positions.

2. The improvement as claimed in claim 1, including a first guide arrangement carried by said conical shell; said annular assembly at least partially supported by and guided for longitudinal motion relative to said conical shell by said first conical shell guide arrangement.

3. The improvement as claimed in claim 1, said cold flaps including trailing edges and including fresh air nozzles at the trailing edges of said cold flaps in communication with said air flow channel.

4. The improvement as claimed in claim 1, including an axially movable first guide ring associated with said hot flaps and connected to each hot flap by a link rod; said first set of actuators connected to said first guide ring for moving said first guide ring axially.

5. The improvement as claimed in claim 1, including a second longitudinally movable control ring associated with and connected to said cold flaps, said second control ring carried by the annular assembly for movement therewith.

6. The improvement as claimed in claim 5, said second control ring connected to each said inner skin of said cold flaps by a cam and follower assembly arranged so that upon extension of the second control ring relative to the annular assembly, the cam and follower assembly drives the respective cold flap radially inwardly about its respective pivot and vice versa when the second control ring is retracted.

7. The improvement as claimed in claim 2, including a cylindrical shell extending axially along the nozzle around at least part of said conical shell; said conical shell connected to said cylindrical shell at an upstream end thereof so as to leave a cavity between an outer side of said conical shell and an inner side of said cylindrical shell; said cylindrical shell including a second guide arrangement for supporting and guiding motion of said annular assembly in cooperation with said first guide arrangement; said third set of actuations located in said cavity and anchored at their upstream ends to the assembly of conical shell and cylindrical shell, and connected at their downstream ends to said annular assembly.

* * * * *